S. HARRIS.
Balance.
No. 39,145.
Patented July 7, 1863.
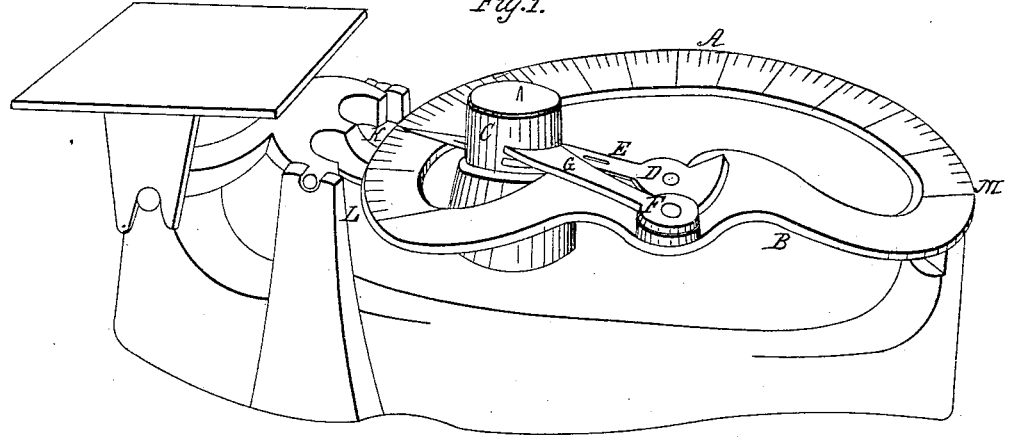
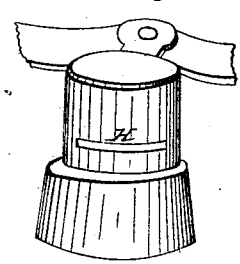
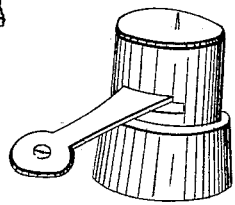
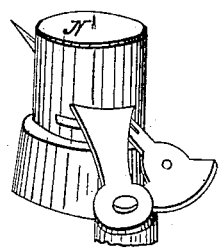
Witnesses:
F. A. Walker
John Farr
Inventor:
Sandy Harris

UNITED STATES PATENT OFFICE.

SANDY HARRIS, OF PHILADELPHIA, PENNSYLVANIA.

IMPROVEMENT IN BALANCES.

Specification forming part of Letters Patent No. 39,145, dated July 7, 1863.

*To all whom it may concern:*

Be it known that I, SANDY HARRIS, of Philadelphia, in the county of Philadelphia, in the State of Pennsylvania, have invented a new and improved mode of adjusting, moving, and denoting the movements of the weight used in scales and other balances for weighing, or for testing the pressure of steam; and I do hereby declare that the following is a full and exact description thereof, reference being had to the accompanying drawings, and to the letters of reference marked thereon.

The nature of my invention consists in substituting for that part of scales or other balances which extends outward from the knife-heads, for the reception of a weight or weights, a graduated arc or half-circle, with a single weight so adjusted as to cause its movements round the arc, when denoted on the latter by an accompanying index, to answer the purpose of weighing, or for testing the pressure of steam.

To enable others to make and use my invention, I will describe its construction and operation.

I construct my scale, for instance, in any of the known forms, except as to the part for which my invention is a substitute. This I dispense with, and in its stead extend out from the knife-heads, as far as the scope of the scale I wish to make requires, a plate of iron, brass, or other suitable material, and give it the shape of a half-circle or arc, as shown at A, Figure I. This arc is of sufficient thickness to sustain its own and the additional weight it is intended to carry—say three-sixteenths or a quarter of an inch—and presents a face upward—say an inch and a quarter across. Its two extremes are on a line at right angles with the line of the knife-heads, and are left connected together by the part B. Within I leave an open space for the weight C to move in, and of sufficient length for the center of the weight to be carried from one extreme of the arc to the other. The center D, being the one from which the arc is turned, receives the pivot on which the hand or index E turns in passing around the arc. A point back of this, at F, receives the pivot of the hand G, which is the weight-bearer. This point is equidistant from the two extremes of the arc L and M, and at a distance from center D equal to twenty thirty-sevenths of the length of the index-hand from its pivot to the point where it comes in contact with the center of the weight when the latter is attached to its bearer and rests with the index, at the immediate beginning of the arc. The weight is permanently attached to the traveling end of the bearer, should be of circular form, and, better, of the same shape and size at both ends, though the drawings show a variation from this rule. It should be so attached to its bearer as to project the same distance above and below the plate of the arc, and the bearer should be so elevated at its pivot as to admit of its passing over the index when both are moving together. After this the index, if made to operate on the center of the weight, will, with its own regular movements around the arc, conduct the weight on its circuit and with an irregularity which will approximate to regularity when considered in reference to the result on a direct line to and from the fulcrum or knife-heads. This being the case, the spaces described by the index on the face of the arc will, when the weight is made to balance accumulating weight on the other end of the balance, also approximate to regularity.

To cause the index-hand to operate punctually on the center of the weight and carry it round, requires either that the weight shall partially revolve on its bearer and slide on the index, or that it shall both partially turn and slide on the index. I have adopted the latter plan, and have carried it out in this way: Through the body of the weight, just under the point where it is attached to its bearer, I have made an opening, H, Figure II, sufficiently wide to admit of the partial turning of the weight, and otherwise sufficient for the index to pass through it. From the top of the weight down through the immediate center I have inserted a small rod or pivot, N, Fig. V, which, passing through the opening in the index J, Fig. III, admits of both the turning and sliding referred to, when the hands are being moved. As the index itself is not, in the matter of its weight, operated on by the rule which governs the peculiar movements of the weight and its bearer, it should be made so as to balance, taking its pivot for the fulcrum; but any error in this, as well as any trifling departure from regularity in the operations of the weight and hands, is overcome in graduating the arc, which should be done when all else is complete, and always with the aid of positive and correct weights.

In manufacturing, the arc may be cast separately, as in the case of the model, and attached to the balance at K, Fig. I, or it may be cast with the balance entire. When in all other respects so far finished as to be balanced and graduated, the weight should be placed at the beginning point L, and then, with the arc and its other appurtenances, be made to balance with the opposite end of the scale. In moving the weight for graduating or weighing, the hand may be applied to either that or the index. When fully and correctly graduated, the process of weighing will be simple enough, and far less perplexing than that in which a multitude of weights has to be resorted to. If an ounce, for instance, is to be weighed, move the point of the index to the mark indicating that weight on the arc, and then bring the scale to a balance. In moving the hands I sometimes use a hand-wheel at O, Fig. IIII.

Having thus fully described my invention—that is to say, the graduated arc, the weight, the weight-bearer and index, and the centers on which the two latter turn as regards their relative position toward each other—what I claim as new therein, and desire to secure by Letters Patent, is—

The manner, mode, and means, substantially as set forth and described, of arranging, moving, and denoting the movements of the weight to and from the fulcrum or knife-heads, for weighing purposes, or for testing the pressure of steam, and whether used in this or any other form of balance.

SANDY HARRIS.

Witnesses:
  WM. LACEY,
  A. H. PALMER.